US012770398B2

(12) United States Patent
Schulenberg et al.

(10) Patent No.: US 12,770,398 B2
(45) Date of Patent: Oct. 20, 2026

(54) METHOD FOR CATEGORIZATION OF PACKAGES FOR LOADING A TERMINAL STATION

(71) Applicant: BEUMER GROUP GMBH & CO. KG, Beckum (DE)

(72) Inventors: Martin Schulenberg, Anröchte (DE); Frederik Radner, Oelde (DE)

(73) Assignee: BEUMER GROUP GMBH & CO. KG, Beckum (DE)

( * ) Notice: Subject to any disclaimer, the term of this patent is extended or adjusted under 35 U.S.C. 154(b) by 842 days.

(21) Appl. No.: 18/173,746

(22) Filed: Feb. 23, 2023

(65) Prior Publication Data

US 2023/0274550 A1 Aug. 31, 2023

(30) Foreign Application Priority Data

Feb. 25, 2022 (EP) .................................... 22158851

(51) Int. Cl.

*G06V 20/50* (2022.01)
*G06V 10/74* (2022.01)
*G06V 10/764* (2022.01)

(52) U.S. Cl.

CPC ............ *G06V 20/50* (2022.01); *G06V 10/761* (2022.01); *G06V 10/764* (2022.01)

(58) Field of Classification Search

CPC ...... G06V 20/52; G06V 10/764; G06V 10/82; G06V 20/56; G06V 20/59; G06V 20/64; G06V 10/143; G06V 10/255; G06V 10/26; G06V 10/74; G06V 10/776; G06V 20/54; G06V 20/62; G06V 2201/06; G06V 2201/07; G06V 30/2247; G06V 40/103; G06V 20/20; G06V 20/588; G06V 2201/03; B63B 25/28; G08G 1/20
See application file for complete search history.

(56) References Cited

U.S. PATENT DOCUMENTS

| | | | | |
|---|---|---|---|---|
| 11,961,281 B1 * | 4/2024 | Kim | G06V 20/64 | |
| 2012/0294702 A1 * | 11/2012 | Greer | B63B 25/08 | 414/803 |
| 2015/0264319 A1 * | 9/2015 | Wood | B65B 19/30 | 348/125 |
| 2019/0135461 A1 * | 5/2019 | Pippin | B65B 43/52 | |
| 2019/0205829 A1 * | 7/2019 | Abebe | G06Q 10/0833 | |

FOREIGN PATENT DOCUMENTS

| | | |
|---|---|---|
| EP | 2297010 B1 | 2/2013 |
| EP | 2686260 B1 | 5/2016 |

* cited by examiner

*Primary Examiner* — Alex Kok S Liew
(74) *Attorney, Agent, or Firm* — Harness, Dickey & Pierce, P.L.C.

(57) ABSTRACT

A method for categorizing packages (1) for loading a terminal station (3), in particular a shipping container, the method including: a) acquiring at least one item-specific information for each package (1) of a plurality of packages (1) in a sorter (2) for loading a terminal station (3); b) categorizing the packages (1) based on the respective object-specific information acquired, wherein at least one category from a plurality of categories is assigned for each of the packages (1); wherein, during the categorization, a weighting factor dependent on the object-specific information or on a further object-specific information of the respective package (1) is determined, wherein the object-specific information is subjected to the weighting factor so that a weighted object-specific information of the respective package (1) is obtained.

26 Claims, 3 Drawing Sheets

METHOD FOR CATEGORIZATION OF PACKAGES FOR LOADING A TERMINAL STATION

CROSS REFERENCE TO RELATED APPLICATIONS

This application claims the benefit and priority of European Patent Application No. 22158851.0 filed Feb. 25, 2022. The entire disclosure of the above application is incorporated herein by reference.

BACKGROUND OF THE INVENTION

Technical Field

The invention relates to a method for the categorization of packages for loading a terminal station, for example a shipping container. Such a method is known from EP 2 686 260 B1.

Discussion

In the Courier Express Parcel (CEP) sector, supraregional parcel centers have become established, into which parcel shipments from a large number of branches assigned to the parcel center in question are delivered and sorted for onward transport, for example to regional distribution centers. Sorters of various types have become established for sorting, for example so-called cross-belt sorters, into which the parcels to be sorted are fed and, for example, sorted according to their destination address or another sorting criterion, either directly into corresponding shipping containers or buffered in terminal stations, for example sorting end stations, before the shipping container is loaded. A corresponding cross-belt sorter is known from EP 2 297 010 B1.

The packages to be transported sometimes differ quite considerably from one another in terms of their dimensions, volume, weight, and other physical properties. Although it is state of the art to already measure the packages to be sorted on the aforementioned sorter with regard to the aforementioned properties, the filling of the shipping containers is still associated with considerable uncertainties. For example, when loading the shipping container with a bulky parcel, the parcel may fall into the shipping container in such an unfavorable orientation that it cants in the shipping container or at least blocks a volume that exceeds its own volume by a multiple. Thus, it is not possible to predict the number or volume of individual packages that can be accommodated in the shipping container for optimal, at least approximately 100%, filling when they are loaded into the shipping container individually or in a bulk. As a result, the shipping containers are either inadvertently overloaded or, due to the inclusion of a buffer to prevent overloading, often only incompletely filled.

In addition, packages that are already damaged or easily damaged due to their packaging or other external condition can suffer further damage due to the small footprint of the shipping containers compared to their height, for example, if they are filled into the shipping container early and thus lie further down in the shipping container, so that many more layers of possibly heavy packages are loaded onto the damaged or easily damaged package.

It is therefore the aspect of the invention to propose a method for loading a terminal station with parcels which, on the one hand, permits effective utilization of the receiving volume of the terminal station and, preferably, is further arranged to protect parcels from damage during loading of the terminal station.

SUMMARY

This aspect is solved by a method having the features of claim 1. Advantageous embodiments of the invention are the subject of the respective dependent claims.

Accordingly, it is provided that, during the categorization, a weighting factor is determined which depends on the object-specific information or on a further object-specific information of the respective package and to which the object-specific information is subjected, whereby a weighted object-specific information of the respective package is obtained.

Acquiring the at least one object-specific information may comprise acquiring a volume, a shape, or a weight and at least one further object-specific information of the respective package. Then, during the categorizing, at least one weighting factor may be determined from the at least one further object-specific information to be applied to the volume, shape, or weight, obtaining a weighted volume, shape, or weight of the respective package.

Thus, for optimizing the loading of the shipping container, in one embodiment of the invention, an expected packing volume of the package can be taken into account, which the package will occupy when loaded into the shipping container. This expected packing volume may depend on various characteristics of the package and also surrounding packages. For example, lowered mechanical strength of the package may cause the package to be compressed if the package is located further down in the terminal station and is compressed by overlying packages and their weight. In addition, the dimensions of a package can provide an indication of how much volume the package is likely to occupy in the terminal station, such as in a shipping container, e.g., a roll container, especially the volume in excess of its intrinsic volume, which may be significantly increased, for example, due to a geometry that deviates significantly from the cube shape. In particular, elongated and thus bulky objects of higher strength, such as packages packed in cardboard packaging, may occupy a volume in the state loaded into the terminal station which is a multiple of the intrinsic volume. In particular, several of the aforementioned object-specific information may also be taken into account when categorizing and determining the at least one weighting factor.

The terminal station in the sense of the invention is not limited to any particular embodiments. An terminal station in the sense of the invention can, for example, be a sorting terminal station which is arranged to be transferred to a shipping container, for example a rolling container. However, a terminal station in the sense of the invention may also be the aforementioned shipping container or a rolling container. When reference is made in the following to a terminal station, a sorting end station, a shipping container, a rolling container or the like, each of the embodiments mentioned is intended to be encompassed.

Categorizing may comprise sorting the packages to one of at least two separate terminal stations, which are reloaded into the shipping container in a loading sequence. The terminal stations may be used as intermediate buffers to separate the packages from each other according to at least one sorting criterion prior to loading into the shipping container. The sorting criterion may be a sorting criterion derived from the object-specific information and preferably from the at least one further object-specific information. For example, light parcels may be separated from heavy parcels. Alternatively or additionally, large packets may be separated from small packets. Further alternatively, solid packets can be separated from compressible packets. In each case, value ranges can be defined for the aforementioned sorting criteria.

The reloading of the parcels may comprise the ejection of the parcels from at least one of the terminal stations onto a discharge conveyor guided between the terminal stations and a loading station for shipping containers. Alternatively, the terminal stations may be loaded directly into the shipping container. For example, the terminal stations can be emptied into the shipping container by dumping.

The at least two terminal stations can be reloaded into the shipping container in the loading sequence after the sum of the weighted volumes of the packages sorted to the terminal stations has reached a holding volume of the shipping container. Alternatively, it can be provided that before the reloading of the terminal stations into the shipping container, the sum of the weighted volumes exceeds the holding volume of the shipping container. This may be appropriate, for example, if additional compression of soft packages, such as film bags, is to be expected as a result of the reloading of the terminal stations into the shipping container. This may be the case, for example, if solid parcels are separated from compressible parcels via the sorting terminal stations and it is simultaneously detected that, when the receiving volume of the shipping container is reached, the solid objects incidentally have an accumulated weight which leads to additional compression of the soft parcels when the latter are loaded first into the shipping container and then the heavy, solid objects are loaded onto the soft objects.

However, if avoiding damage has priority, it may alternatively be provided that the soft objects are loaded onto the heavy, solid objects, whereby the increase in the capacity of the shipping container achieved in the variant described above is not achieved due to the compression of the soft objects. On the other hand, an increase in the capacity when loading the soft objects onto the heavy, solid objects can be achieved by the soft objects penetrating into gaps between the heavy, solid objects due to their comparatively higher flexibility and thus occupying empty spaces between the heavy, solid objects.

Acquiring the at least one item of object-specific information may comprise generating an image of the package. In this regard, categorizing may comprise matching the generated image with images in a database, each of which is associated with at least one category. Matching the image with the images in the database may include determining the image in the database between which there is the least discrepancy compared to the image. For example, determining the discrepancy may comprise matching a distance between a surface of a fill volume in the shipping container and a top edge of the shipping container.

The method may further comprise storing the generated image in the database. The image can be assigned at least the at least one category which, during matching, is assigned to the image in the database which has the smallest deviation from the image.

The determination of the at least one object-specific information comprises the determination of a volume-independent object-specific information, preferably the determination of a weight, a damage, a shape, a strength, or a source of danger. The determination of volume-independent, object-specific information can be used, for example, to reject packages which, on the basis of the acquired volume-independent, object-specific information, are either not suitable for loading into a shipping container, for example because they have a source of danger or are damaged, or which, due to some other property, counteract the objective underlying the invention of achieving the most effective utilization of the shipping container, such as packages which are oversized or bulky, or which are unsuitable for automated loading of the shipping container.

Further, capturing at least one object-specific information may comprise capturing at least one mechanical property for at least a portion of the plurality of packages, wherein the categorizing is additionally performed based on the mechanical property.

For the optimization of the loading of the shipping container, a mechanical object-specific property of the packages to be loaded can thus also be taken into account. For example, it is possible to initially load the shipping container with film bags or other soft packaging units on the assumption that these will be further compressed during further loading of the shipping container, for example with parcels which have a comparatively harder cardboard outer packaging and are therefore not to be compressed during transport, thus making better use of the capacity of the shipping container to accommodate additional parcels. In principle, however, there is a conflict of objectives in that heavy packages are considered to lead to the compression of the soft packages, but potentially to greater damage to the soft packages.

Accordingly, in one embodiment, the categorization can be set up to separate packages, for example soft packages, which could potentially be exposed to damage during loading into the terminal station or shipping container, from packages that are more robust in comparison, for example packages packed in cartons. This allows the parcels to be loaded into the terminal station or shipping container in a preferred order, preferably with the parcels identified during categorization as easily damaged parcels being loaded into the terminal station or shipping container after the remaining parcels, in particular robust parcels.

Alternatively or additionally, the detection of the mechanical property may also include the detection of damage to the package or to an overpack of the package, so that the damaged packages are filled last into the shipping container and are thus spared from the weight-related load of packages lying above them.

For example, when categorizing the packages, a category of damaged packages and/or a category of soft packages that can be compressed and/or a category of packages packed in rectangular boxes may be provided for prioritizing the packages.

The determination of a loading sequence may be aimed at determining, depending on the mechanical properties associated with the category, a suitable order of loading the packages into the shipping container, which promises the most complete loading possible of the packages previously assigned to the categories into the shipping container.

Optionally, the parcels of the same category can be temporarily stored in one terminal station each after categorization and before loading the shipping container. Alternatively, the parcels can be buffered on the sorter until a combination of parcels of the different categories has been determined and categorized on the sorter, which promise the most efficient, i.e. preferably the most complete possible filling of the shipping container when taking into account the determined loading sequence.

Detecting the at least one mechanical property may comprise detecting the strength and/or completeness of the package or a package of the package. This may comprise detecting cracks and/or other irregularities or damage to a package of the subject package.

The packages can be fed into a circulating sorter, preferably a recumbent sorter, a pocket sorter or a combined recumbent and pocket sorter, for the acquisition of the at least one object-specific information, wherein the acquisition of the at least one object-specific information takes place while the packages are transported in the circulating sorter. The capturing of the item-specific information may also occur outside of the recirculating sorter, for example during the insertion into the recirculating sorter. The object-specific information may also be or comprise item master data.

The detection of the at least one mechanical property is preferably contact-free, particularly preferably optical and in a very particularly preferred embodiment camera-based and with the aid of digital image processing, for example comprising edge detection. For example, the strength of the package or of an outer packaging of the package can be concluded with a sufficiently high degree of accuracy on the basis of the geometry of the package. For example, compared to foil bags, firmer cartons have a substantially cuboid geometry, while softer packages, such as the aforementioned foil bags, have a polyhedral geometry, which can be easily distinguished, for example camera-based, using image processing methods common in the prior art.

The categorization can include the ejection of the parcels into one of a plurality of terminal stations, with each terminal station being assigned one of the categories. The loading of the shipping container can include the emptying of the terminal stations in the loading sequence into the shipping container.

Detecting the at least one mechanical property may comprise detecting a respective strength of the plurality of packages or a respective outer wrapper or outer packaging of the plurality of packages, wherein the packages are each categorized into one of at least two categories of different strength ranges when categorized.

When detecting the at least one mechanical property, it can be detected whether the respective package has a reversibly deformable outer packaging or not. When categorizing, the packages can be divided into packages with reversibly deformable outer packaging and those without reversibly deformable outer packaging.

During the acquisition of the at least one object-specific information, at least one further property from the group of weight, volume and dimensions can be acquired for at least some of the packages of the plurality of packages. For example, when categorizing the packages that have been assigned to the category of packages without reversibly deformable outer packaging, an average density can be assigned from the volume and the weight, which can be used to determine an expected compression of the packages, which have been assigned to the category of reversibly deformable parcels during categorization, from the volume and weight, which can be used to derive an expected compression of the parcels which have been assigned to the category of reversibly deformable parcels during categorization, if, during loading of the shipping container in the loading sequence, the reversibly deformable parcels are first filled into the shipping container and then the parcels without reversibly deformable outer packaging are loaded onto the deformable parcels.

The at least one further property from the group of weight, volume and dimensions can be recorded at least for those packages of the plurality of packages for which the strength of their respective outer shell or outer packaging has been recorded during the recording of the at least one mechanical property. The packages may be classified into one each of at least two categories of different strength ranges when categorized.

When loading the shipping container, the packages of the category of a first strength range can be loaded into the shipping container before the packages of the category of a second strength range higher than the first strength range. In the course of the expected compression of the packages of lower strength during the further loading of the shipping container, for example also with packages of higher strength, this allows the loading of the shipping container with a larger quantity of packages in terms of number of pieces and/or volume. As already explained above, the stream loading sequence can also be reversed if the best possible assurance of damage-free transport of the packages is prioritized over maximum utilization of the loaded volume of the shipping container. The categorization just makes it possible, in one embodiment, to freely select the previously described order depending on priority.

Preferably, prior to loading, a first total volume of the packages of the first category and a second total volume of the packages of the second category that will be loaded into the shipping container in the loading sequence can be determined as a function of an expected compression of the packages of the second category when loading the packages of the first category onto the packages of the second category. This makes it possible to know, even before loading the shipping container, the combination of parcels to be loaded, including their loading sequence, which promises the best possible utilization of the storage volume of the shipping container when loading the shipping container while adhering to the loading sequence, for example, causing neither overfilling nor underfilling of the shipping container.

The method may comprise, prior to detection, the introduction into the sorter of the plurality of parcels and preferably further parcels to be loaded into another shipping container, the parcels being buffered in the sorter and only being loaded into the shipping container in the loading sequence, preferably immediately, when the loading of the plurality of parcels is expected to complete the loading of the shipping container. In this embodiment, the use of terminal stations for buffering the categorized packages can be omitted. Instead, the sorter itself may be used as a buffer. Alternatively or additionally, a pocket sorter may be used for buffering, into which the categorized packages are discharged from the sorter, for example a cross-belt sorter, onto which the packages have previously been fed, to be retrieved from a buffer of the pocket sorter in the loading sequence when the shipping container is to be loaded in the loading sequence.

The shipping container can be expected to be fully loaded when the plurality of packages determined for loading the shipping container, taking into account an expected packing density for the determined loading sequence, has a filling volume that is equal to or at least close to a holding volume of the shipping container.

Before loading the shipping container, a loading status can be detected, preferably detecting whether the shipping container is empty. In this way, it can be ensured that the shipping container does not contain any packages or other shipments prior to loading that do not belong to the batch of packages that will subsequently be loaded into the shipping container.

Detecting at least one item of object-specific information may comprise detecting damage to at least one of the packages, preferably an outer wrapper or outer packaging of the package. Thereby, in the case of a detected damage for at least one of the packages, the respective package may be assigned to a damaged package category during the categorization. Preferably, the parcels in the category for damaged parcels are assigned to an end position in the loading sequence when the loading sequence is determined and are thus loaded last into the shipping container. In this way, it can be ensured that the damaged packages are not further damaged due to further loading and compression by packages above them.

According to yet another embodiment of the invention, in addition or as an alternative to the aforementioned measures, a sensory, for example an optical, detection of the loading state of at least one terminal station, into which packages of the same category are presorted for each terminal station, can be carried out for determining a loading sequence. This can be camera-based, for example. For example, the packing behavior of the packages of the same category buffered in the terminal stations can be detected. Based on the packing behavior that occurs in the terminal station, conclusions can be drawn about the packing behavior of the relevant packages when they are reloaded from the terminal station into the shipping container during loading of the shipping container. Alternatively, the sensor-based detection of the loading status can also be carried out exclusively at a final terminal station, for example a shipping container, such as a roll container, in order to reduce the number of measuring points and thus the technical complexity of the system.

The method may include continuously or iteratively adjusting an algorithm for categorizing the packets. For this purpose, the smallest deviation detected during matching may be minimized by varying the weighting factor and using a thereby obtained varied weighting factor in a further categorization step of a further packet. The algorithm for categorizing the packets is preferably adapted using machine learning.

BRIEF DESCRIPTION OF THE DRAWINGS

Further details of the invention are explained with reference to the figures below. Thereby shows.

DESCRIPTION OF THE PREFERRED EMBODIMENTS OF THE INVENTION

Figure 1:
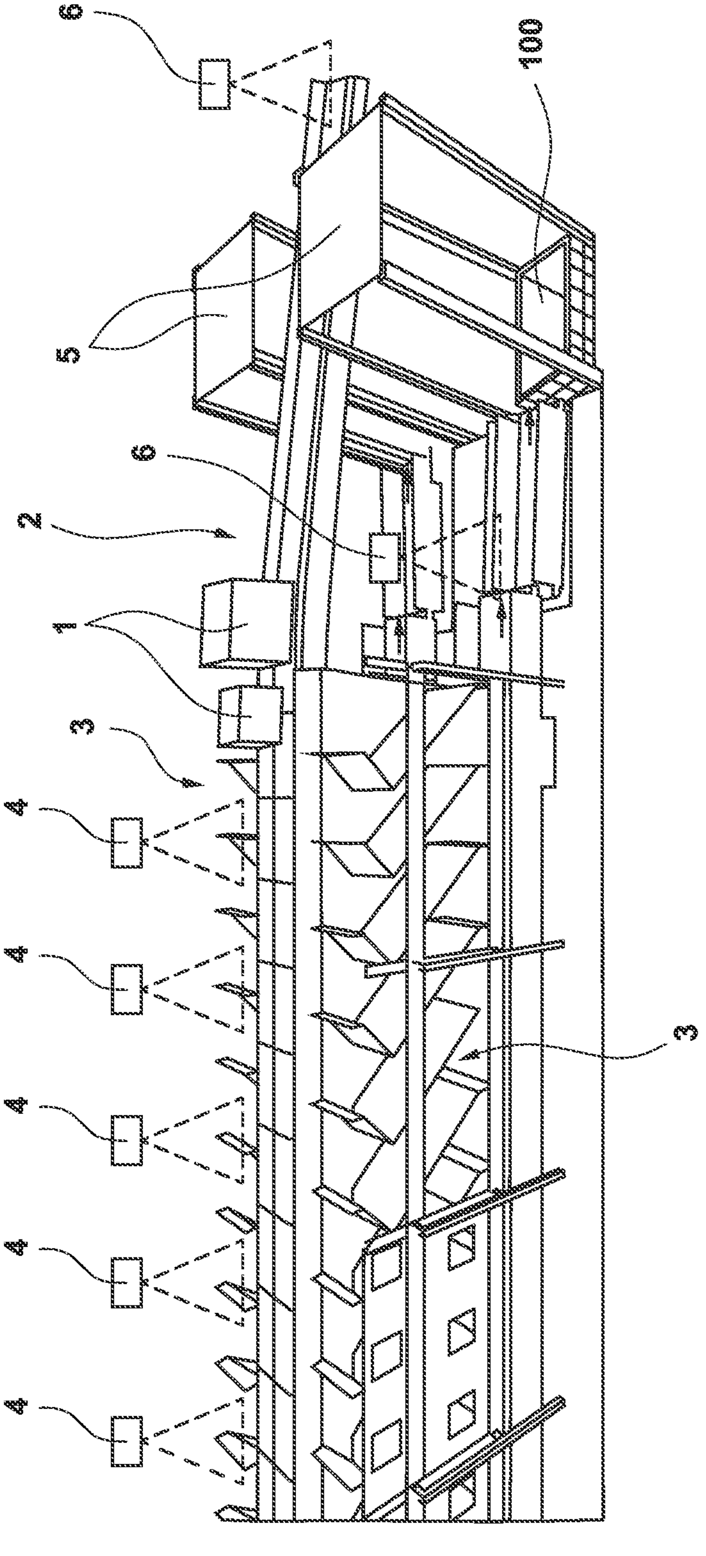
FIG. 1 an exemplary embodiment of a sorter.

FIG. 1 shows an exemplary embodiment of a sorter 2 for carrying out the process. In the present case, the sorter 2 is designed as a cross-belt sorter which, for example, forms a circulating transport loop and has at least one feed for packages 1 to be sorted. As is known in principle from the prior art, the packages 1 can be detected and categorized by sensors on the sorter 2. For example, in addition to sender and address data, physical properties of the package can also be detected, for example dimensions and the weight of the package 1. In one embodiment, it can be provided that still on the sorter 2, in addition to the already mentioned object-specific information, at least one mechanical property is additionally detected for at least part of the plurality of packages 1 and preferably for all of the packages 1. The mechanical property may be, for example, a strength of the package or an outer packaging of the package 1. Accordingly, when categorizing the packages 1 based on the object-specific information, a distinction can be made according to the strength of the packages 1. For example, packages 1 having a substantially solid (cardboard) packaging can be distinguished from packages 1 that are, for example, in foil bags.

For categorization, the packages 1 of different categories can be presorted into different terminal stations 3. A camera system 4 above the terminal stations 3 can be used to detect a loading state of the terminal stations 3. For example, in the case of the packages 1 packed in usual solid cartons, the bulk and filling behavior of these packages 1 can be inferred from the bulk and filling behavior of the packages 1 occurring in the relevant terminal station 3 when they are poured from the terminal station 3 into the shipping container 100 for loading the shipping container.

Figure 2:
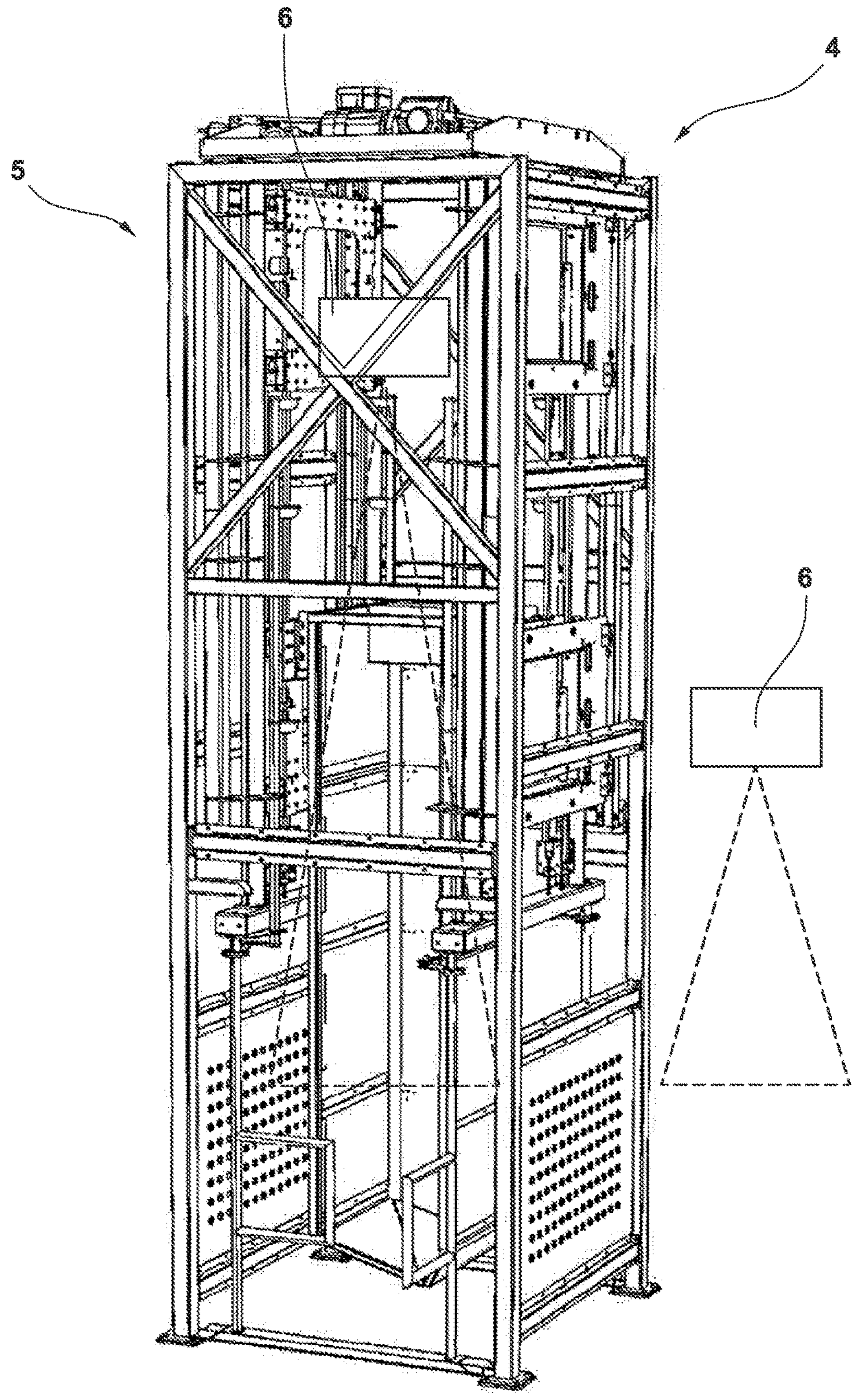
FIG. 2 an exemplary embodiment of a loading tower for shipping containers.

FIG. 2 shows a loading tower 5 for loading a shipping container 100, which has a camera system 6 at its upper end, which is set up to detect the filling state of the shipping container 100 before the shipping container 100 is filled, in particular to determine whether there are still items from a previous sorting process in the shipping container, or whether the shipping container 100 is completely empty and thus available for loading with parcels 1. Alternatively, the camera system 6 can also be provided outside the loading tower so that the shipping containers 100 to be loaded are already checked for complete emptying before they are moved into the loading tower 5.

After the packages 1 have been categorized and pre-sorted for this purpose, for example, in the manner described above in terminal stations 3, the loading sequence can be recorded with additional consideration of the at least one mechanical property for at least some of the plurality of packages 1. Thereby, at least two of the categories or the packages 1 assigned to the categories may differ in at least one mechanical property. For example, the packages 1 of a first category may have a greater strength than the packages 1 of a second category. For example, the packaging of the packages 1 of the first category may be a substantially rigid packaging, for example a packaging made of cardboard, while the packaging of the packages 1 of the other category may be a soft packaging, for example a foil bag. For achieving a maximum number of packages 1 that can be loaded into the shipping container, it may be provided that the packages 1 with the soft packaging are loaded into the shipping container 100 before the packages 1 of the category of packages 1 with hard packaging. As a result, the loading of the packages 1 with hard packaging onto the packages 1 with soft packaging results in a compression of the packages 1 with soft packaging and thus in a compression of the packages 1 with soft packaging, thereby increasing the number of packages received in the shipping container 100.

In addition, the bulk and packing behavior of the packages 1 with fixed packaging in the terminal station 3 can be used to infer the bulk and packing behavior of the packages 1 in the shipping container when they are reloaded into the shipping container 100. Also, this information can be used to load the highest possible number of packages 1 into the shipping container without fear of overfilling the shipping container 100. In particular, the safety discounts taken into account in the prior art to prevent overfilling of the shipping container, which must be avoided at all costs, with respect to the number of packages 1 loaded into the shipping container 100 no longer have to be observed, since process-safe loading of the shipping container 100 is achieved on the basis of the categorization of the packages 1.

Figure 3:
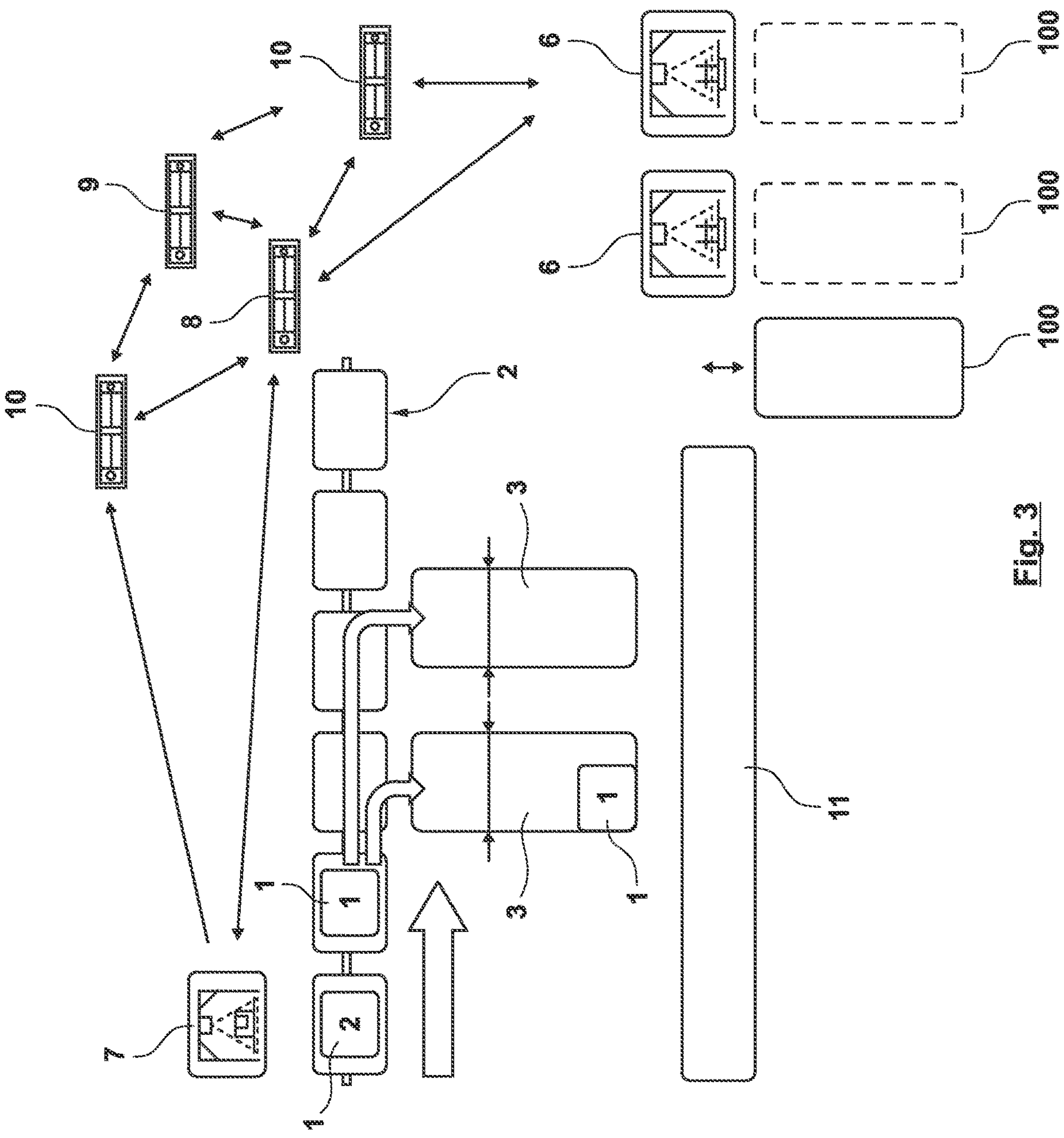
FIG. 3 an example of an arrangement for loading a shipping container with parcels in schematic representation.

FIG. 3 shows a schematic diagram of an arrangement for loading a shipping container 100 with parcels 1 for carrying out the method. The arrangement has a sorter 2, which is designed as a cross-belt sorter. A dimensioning weighing system (DWS system) 7 is provided for recording object-specific information. The DWS system 7 can, for example, be set up to determine the outer dimensions of the package 1 for volume determination in addition to the weight. The DWS system 7 may further be arranged to detect damage to the package 1 or a wrapper of the package 1. The determination of the outer dimensions of the package 1 as well as the determination of possible damages of the package 1 may be determined based on an image and suitable image processing. For generating the image, the DWS system 7 may comprise an optical camera system.

The DWS system 7 is connected via a data link to a control system 8, which receives the object-specific information determined by the DWS system 7. The control system 8 may have an image memory 9 or be connected to an image memory 9 via another data link. The control system 8 may further be arranged for machine learning or may be connected to a separate machine learning system 10 via a data interface. The DWS system 7 may be directly connected to the machine learning system 10 via a data interface if the machine learning system 10 is not part of the control system 8.

The machine learning system 10 or the control system 8 is arranged to categorize the packages 1 based on the acquired object-specific information. The machine learning system 10 may be further configured to determine damage or other characteristic properties of the packages 1 based on the object-specific information captured via the DWS system 7. For determining the categorization, the machine learning system 10 may make use of an image memory 9 that holds a database of reference images with at least one associated categorization. The machine learning system 10 and/or the control system 8 can be set up to store images captured by the DWS system 7, which have been categorized with the aid of the machine learning system 10 by matching reference images of the image memory 9, in the image memory 9 with assignment of the categorization.

Depending on the categorization or independently of it, the packages 1 can be presorted to one of the two terminal stations 3. The terminal stations 3 may—but need not—be provided for separating packets 1 that differ from each other in at least one assigned category after categorization. However, it may also be provided that the two terminal stations 3 receive parcels 1 that have been assigned the same category or categories during categorization, so that the two terminal stations 3 merely represent separate buffer stores for storing the parcels 1 prior to loading the shipping container 100.

During categorization, a weighting factor may be determined to be applied to an actual volume of the package 1 determined by the DWS system 7. The weighting factor may be arranged to take into account an expected packing volume of the particular package 1 when the package 1 has been loaded into the shipping container 100. The packing volume of the package 1 may depend on its dimensions, its strength, and/or other object-specific properties. For example, a soft package 1, such as a foil bag, may have a packing volume that is substantially less than its actual volume. Thus, it may be taken into account that soft packages 1 may occupy spaces between solid and/or cuboid packages when loaded into the shipping container 100, for example, and thus in effect and in the limiting case even occupy no additional volume. Similarly, particularly small but solid packages 1 may have a small packing volume because they may occupy spaces between solid and cuboid packages. Finally, solid and bulky packages 1, for example where one edge length is substantially greater than at least one other edge length of the package 1, may have a packing volume after loading into the shipping container 100 that is greater than their actual volume. In particular, this may relate to elongated packages 1 and flat packages 1.

After the sum of the weighted volumes of the packages 1 in the two terminal stations 3 has reached a for volume of the shipping container 100, the terminal stations 3 or the packages 1 received therein can be reloaded into the shipping container 100. For this purpose, the terminal stations 3 can be discharged onto a discharge conveyor 11. From the discharge conveyor 11, the parcels 1 are introduced into the shipping container 100, for example via a filling opening at or near the top of the shipping container 100.

In order to further increase the process reliability of the fill-level-optimized filling of the shipping container 100, a camera system 6 or other sensor system can be provided that detects the fill state, in particular the empty state, of the shipping container 100 before the shipping container 100 is filled.

Similarly, the same camera system 6 or a second camera system may be configured to capture a fill state of the shipping container 100 after the shipping container 100 has been filled. For this purpose, for example, an image of the shipping container 100 or of the filling opening of the shipping container 100 can be captured via the top side of the shipping container 100. By comparison with reference images in an image memory 9, it can be determined to what extent the optimum fill level of the shipping container 100 has been achieved. The image of the shipping container 100 stored in the image memory 9 can be linked to the individual weighted volumes and, if applicable, other properties of the packages 1 in the shipping container 100.

By comparing the determined fill level and by relating the fill level to the weighted volumes linked to the fill level via the image, an optimization of the loading process of the shipping container 100 can be achieved. From a plurality of fill level images associated with respective weighted volumes, machine learning can be used to detect regularities that lead to underfilling or overfilling of the shipping container 100. For example, it may be recognized that the proportion of small and/or compressible packages 1 may be increased if there is a certain proportion of bulky packages 1 that form teaching spaces that can fill the small and compressible packages 1. This may result in the weighting factor of small and/or compressible packets 1 being further decreased.

The features of the invention disclosed in the foregoing description, in the drawing as well as in the claims may be essential for the realization of the invention both individually and in any combination.

What is claimed is:

1. A method for categorizing packages for loading a terminal station, in particular a shipping container, the method comprising:

a) Acquiring at least one object-specific information for each package of a plurality of packages in a sorter for loading a terminal station, the object-specific information being selected from a group of mechanical properties including rigidity, bulk packaging behavior, volume, weight and package damage;

b) Categorizing the packages based on the respective object-specific information acquired, wherein at least one category from a plurality of categories is assigned for each of the packages;

wherein, during the categorization, a weighting factor dependent on the object-specific information or on a further object-specific information of the respective package is determined, wherein the object-specific information is subjected to the weighting factor so that a weighted object-specific information of the respective package is obtained; and wherein said acquiring the at least one object-specific information comprises acquiring a respective strength of the plurality of packages or a respective outer wrapper or outer packaging of the plurality of packages, wherein the packages are each classified into one of at least two categories of different strength ranges when categorized.

2. The method of claim 1, further comprising:

c) Determining a loading sequence in which the packages are to be loaded into the terminal station, taking into account the at least one category associated with each of the packages; and d) Loading the terminal station in the loading sequence.

3. The method according to claim 1, in which said acquiring of the at least one object-specific information comprises acquiring of a volume and at least one further object-specific information of the respective package, and in which, during said categorizing, the weighting factor to be subjected to the volume is determined from the further object-specific information, whereby a weighted volume of the respective package is obtained.

4. The method according to claim 1, wherein the categorizing comprises sorting the packages to one of at least two terminal stations separated from each other, which are reloaded in the loading sequence into the terminal station.

5. The method according to claim 4, wherein the reloading of the packages comprises ejecting the packages from at least one of the terminal stations onto a discharge conveyor guided between the terminal stations and a loading station for terminal stations.

6. The method according to claim 4, in which the at least two terminal stations are reloaded into the terminal station in the loading sequence after the sum of the weighted volumes of the packages sorted to the terminal stations has reached a receiving volume of the terminal station.

7. The method according to claim 1, wherein acquiring the at least one object-specific information comprises acquiring at least one mechanical property for at least a portion of the plurality of packages.

8. The method according to claim 1, wherein acquiring the at least one object-specific information comprises generating an image of the package, and wherein categorizing comprises matching the generated image with images in a database, each of which is assigned at least one category.

9. The method of claim 8, comprising depositing the generated image in the database, wherein the depositing includes assigning to the image at least the at least one category that, when matched, is assigned to the image in the database that has the least deviation from the image.

10. The method according to claim 1, wherein acquiring the at least one object-specific information comprises acquiring a volume-independent object-specific information, preferably a weight, a damage, a shape, a strength or a source of danger.

11. The method according to claim 1, in which, for said acquiring, the packages are fed into a circulating sorter, preferably a recumbent sorter, a pocket sorter or a combined recumbent and pocket sorter, wherein said acquiring of the at least one item of object-specific information takes place while the packages are being transported in the circulating sorter.

12. The method according to claim 1, in which, during said acquiring of the at least one item of object-specific information, it is detected whether the respective package has reversibly deformable outer packaging or not, the packages being divided during the categorization into packages with reversibly deformable outer packaging and those without reversibly deformable outer packaging.

13. The method according to claim 1, in which, when the at least one item of object-specific information is acquired for at least some of the packages of the plurality of packages, at least one further property from the group consisting of weight, volume and dimensions is acquired.

14. The method according to claim 13, wherein the at least one further property from the group of weight, volume and dimensions is detected at least for those packages of the plurality of packages for which the strength of their respective outer wrapper or outer packaging has been detected during said acquiring step, wherein the packages are each classified into one of at least two categories of different strength ranges during said categorizing step.

15. The method according to claim 1, wherein when loading the terminal station, the packages of the category of a first strength range are loaded into the terminal station before the packages of the category of a second strength range higher than the first strength range.

16. The method of claim 15, wherein, preferably prior to loading, a first total volume of the packages of the first category and a second total volume of the packages of the second category loaded into the shipping container in the loading sequence are determined as a function of an expected compression of the packages of the second category when loading the packages of the first category onto the packages of the second category.

17. The method according to claim 1, comprising, prior to said acquiring, introducing the plurality of packages, and preferably further packages, into the sorter, wherein the packages are buffered in the sorter and only then the plurality of packages are loaded into the shipping container in the loading sequence, preferably directly, when the loading of the plurality of packages indicates the complete loading of the shipping container.

18. The method of claim 17, wherein complete loading of the terminal station is expected when the plurality of packages determined for loading the terminal station has a fill volume equal to or approaching a receiving volume of the terminal station, taking into account an expected packing density at the determined loading sequence.

19. The method according to claim 1, wherein a loading condition is detected before loading the terminal station, wherein it is preferably detected whether the terminal station is empty.

20. The method according to claim 1, in which a loading state is detected after loading of the terminal station, wherein it is preferably detected whether the terminal station has a desired filling level, and wherein, particularly preferably, if the desired filling level is exceeded or not reached, a volume is detected with which the desired filling level is exceeded or not reached.

21. The method according to claim 20, wherein for detecting the loading state, a fill level image of an upper filling opening of the terminal station is generated and the generated fill level image is matched with images in a database to which a loading state is assigned, wherein each loading state is assigned a sum of weighted volumes of packages and/or a plurality of individual weighted volumes of packages and/or at least one volume-independent object-specific information for each of the packages assigned to the loading state.

22. The method of claim 21, comprising depositing the generated fill level image in the database, wherein during said depositing, the fill level image is assigned the loading state which, during the matching, is assigned to the image in the database which has the smallest deviation from the fill level image.

23. The method according to claim 21, wherein the loading state detected by said matching is matched with the sum of the weighted volumes of the packages received in the terminal station.

24. The method according to claim 20, further comprising continuously or iteratively adapting an algorithm for categorizing the packets, for which purpose the least deviation detected in said matching is minimized by varying the weighting factor and using a thereby obtained varied weighting factor in a further categorizing step of a further packet, wherein said adapting of the algorithm for categorizing the packets is preferably performed by means of machine learning.

25. The method according to any claim 1, wherein said acquiring at least one item-specific information comprises detecting damage to at least one of the packages, preferably an outer wrapper or outer packaging of the package, wherein upon detecting damage for at least one of the packages, the respective package is assigned to a damaged package category in said categorizing step, wherein the packages of the damaged package category are assigned to a final position in the loading sequence upon determining the loading sequence.

26. A method for categorizing packages for loading a terminal station, in particular a shipping container, the method comprising:

a) Acquiring at least one object-specific information for each package of a plurality of packages in a sorter for loading a terminal station, the object-specific information being selected from a group of mechanical properties including rigidity, bulk packaging behavior, volume, weight and package damage;

b) Categorizing the packages based on the respective object-specific information acquired, wherein at least one category from a plurality of categories is assigned for each of the packages;

wherein, during the categorization, a weighting factor dependent on the object-specific information or on a further object-specific information of the respective package is determined, wherein the object-specific information is subjected to the weighting factor so that a weighted object-specific information of the respective package is obtained;

wherein said acquiring the at least one object-specific information comprises acquiring a respective strength of the plurality of packages or a respective outer wrapper or outer packaging of the plurality of packages, wherein the packages are each classified into one of at least two categories of different strength ranges when categorized; and comprising, prior to said acquiring, introducing the plurality of packages, and preferably further packages, into the sorter, wherein the packages are buffered in the sorter and only then the plurality of packages are loaded into the shipping container in the loading sequence, preferably directly, when the loading of the plurality of packages indicates the complete loading of the shipping container.

* * * * *